United States Patent

March

[11] Patent Number: 5,827,981
[45] Date of Patent: Oct. 27, 1998

[54] FORCE MEASURING DEVICE

[75] Inventor: Adrian Anthony Cecil March, Winchester, United Kingdom

[73] Assignee: Adrian March Limited, Winchester, United Kingdom

[21] Appl. No.: 765,904

[22] PCT Filed: Jul. 14, 1995

[86] PCT No.: PCT/GB95/01668

§ 371 Date: Feb. 28, 1997

§ 102(e) Date: Feb. 28, 1997

[87] PCT Pub. No.: WO96/02814

PCT Pub. Date: Feb. 1, 1996

[30] Foreign Application Priority Data

Jul. 15, 1994 [GB] United Kingdom .................. 9414299

[51] Int. Cl.⁶ ............................................. G02L 5/04
[52] U.S. Cl. ............................. 73/862.642; 73/862.632
[58] Field of Search ...................... 73/862.642, 862.632, 73/862.637, 862.638, 862.624

[56] References Cited

U.S. PATENT DOCUMENTS

| 1,927,478 | 9/1933 | Whittemore et al. | 73/862.642 |
| 2,611,266 | 9/1952 | Wiancko | 73/862.642 X |
| 2,831,343 | 4/1958 | Raring et al. | 73/862.642 X |
| 3,057,196 | 10/1962 | Smock | 73/862.624 X |
| 3,263,498 | 8/1966 | Hagman et al. | 73/862.624 |
| 3,433,064 | 3/1969 | Jacobsen | 73/862.632 X |
| 3,438,251 | 4/1969 | Kloss | 73/862.624 |
| 3,642,502 | 2/1972 | Birkholtz | 73/862.642 |
| 4,175,428 | 11/1979 | Eilerson | 73/862.637 X |
| 4,702,329 | 10/1987 | Click | 73/862.632 X |
| 4,733,571 | 3/1988 | Ormond | 73/862.632 X |

*Primary Examiner*—Elizabeth L. Dougherty
*Attorney, Agent, or Firm*—Larson & Taylor

[57] ABSTRACT

A force sensing device (2) includes substantially inflexible connection portions (4, 8, 14, 16), and elastically deformable elongate leg members (18, 20) spaced apart and extending between the connection portions (4, 8, 14, 16) and having flared ends. The device further includes a measurement device for determining force, especially compressive force, applied between the connection portions (4, 8, 14, 16) by measuring distortion of the elongate leg members (18, 20).

12 Claims, 10 Drawing Sheets

FORCE MEASURING DEVICE

BACKGROUND OF THE INVENTION

1. Field of the Invention

The present invention relates to devices for measuring force.

2. Summary of the Prior Art

In many industrial applications it is commonplace to measure force by applying the force to an elastic member, and measuring the deflection, or strain, of that member. It is normally required to keep the sensing member as compact as possible, and particularly for loads of the order of tonnes, the conventional solution is to measure the local strains at the locations of the maximum stresses caused by the applied load. Typically this is achieved by electrical resistance strain gauges applied to a cylinder in compression, or to a block in shear. The design and fitting of such strain gauges is a matter of compromise: for example, if the adhesive securing them is too flexible, they are inaccurate, and if it is too rigid, they may fall off. The electrical power which can be dissipated in them is limited, and to achieve an accuracy of 0.02%, as is commonly required, signal levels of the order of microvolts have to be measured. This is not easy in an industrial situation, where severe interference can be caused by heavy fluctuating electrical loads in the vicinity. Additionally, in order to achieve maximum accuracy and sensitivity, the maximum strain in the elastic members has to be as high as possible; this introduces problems of creep under a sustained force, and hysteresis in response to a varying force.

An alternative to the use of the elastic member discussed above, in which relatively small strains are measured by strain gauges, is the proving ring: a torus or "anchor ring" to which the force to be determined is applied across a diameter, and the deflection is measured across this same diameter, or the diameter at right angles to it. For a given force, a proving ring can be designed to yield almost as large a deflection as is desired, but it suffers from the disadvantage that the combination of tensile, shear, and bending stresses due to the shape causes it to be physically large, making it awkward to use and also more expensive than alternative devices.

EP-A-0003685 and DE-A-3725535 each disclose an arrangement involving a proving ring. A ring has clamps at opposite ends of a diameter to which forces are applied. In DE-A-3725535, the deformation of the ring (which is circular) is measured in the direction of application of the forces. In EP-A-0003635 the deformation of the ring is measured in a direction perpendicular to the direction of application of the forces.

U.S. Pat. No. 5115680 discloses another apparatus for sensing force, in which two elongate members are mounted between a pair of blocks. One of the blocks is end fixed and the force to be sensed is applied to one end of a spring, the other end of the spring being fixed relative to the first block. The deflection of the spring permits the other block to move, thereby deforming the elongate members. The deformation is measured to measure the force.

SUMMARY OF THE INVENTION

The present invention seeks to provide an elastic member capable, within a compact size, of producing a deflection under the action of an applied force much larger than is normally measured by strain gauges, so that an alternative linear displacement transducer can be employed.

Accordingly, a first aspect of the present invention provides a force sensing device comprising a ring composed at least partially of elastically deformable material, two connection portions located at respective ends of a diameter of said ring, and measurement means for determining the distortion of said ring when a force is applied between said connection portions of the device, the ring in its rest configuration being of greater dimension in a first direction along said diameter than in a second direction perpendicular thereto in the plane of the ring;

wherein:
the ring has two intermediate portions respectively attached to the two connection portions and at least two elongate members extending between the two intermediate portions and being integral with the intermediate portions, the widths of the two elongate members increasing gradually in the second direction at their joins with the intermediate portions.

In a second aspect, the invention provides a force sensing device having two substantially inflexible connection portions, at least one elastically deformable elongate member extending between said connection portions, and measurement means for determining the lateral distortion of said at least one elongate member when a force is applied between said connection portions of the device;

wherein:
said at least one elongate member terminates at each end in an intermediate portion respectively attached to the two connection portions, the two intermediate portions being integral with said at least one elongate member, the width of the at least one elongate member perpendicular to the direction of application of the force increasing gradually at the joins of the at least one elongate member to the intermediate portions.

Thus, according to the present invention, it is possible to provide a force sensing device having connection portions to which force may be applied, and having an elongate member between the connection portions which extends generally parallel to the direction in which the force is applied, but which deforms laterally under load. In preferred embodiments of the present invention, it is possible to achieve a useful deflection at significantly lower stresses that in the conventional elastic member using strain gauges, so that both creep under load and hysteresis are eliminated or substantially reduced. A further advantage of such embodiments is that the linear measurement can relate to an actual physical scale, and can consequently be expressed directly in digital form, rather than as the analogue output typical of a strain gauge system.

A linear measuring system suitable for this application can be constructed using a sensing arrangement having features covered by my existing European Patent Specification Numbers 0100243 and 0184286, and the description will show, by way of example, how these features are applied to the present invention. However, the use of an elastic member of the type described is not restricted to this measuring technique, and any alternative linear measuring system can be used which is appropriate.

BRIEF DESCRIPTION OF THE DRAWINGS

Embodiments of the present invention will now be described in detail, by way of example, with reference to the accompanying drawings, in which.

DETAILED DESCRIPTION

Figure 1:
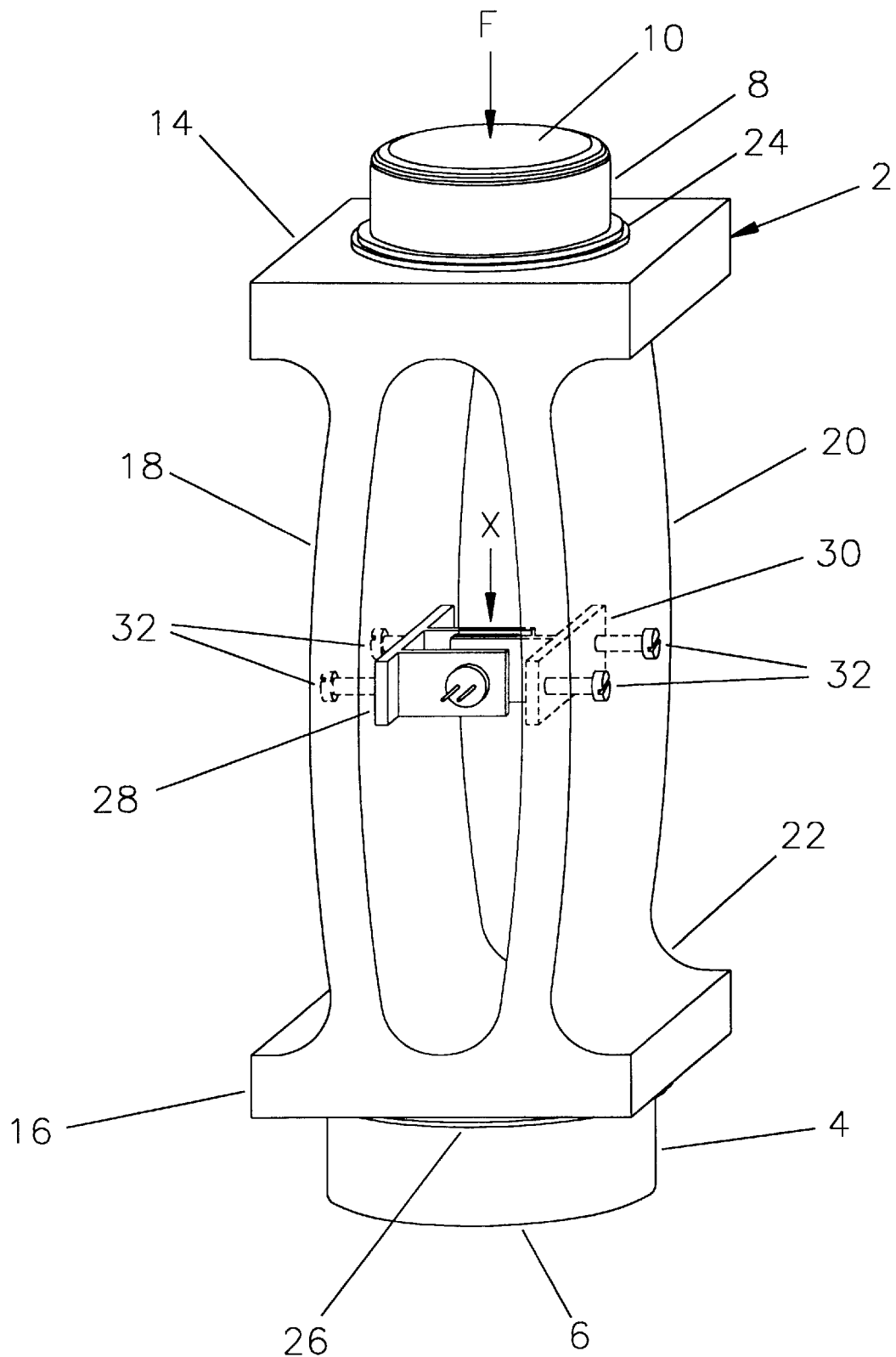
FIG. 1 represents a diagrammatic view of a load sensing device (a "load cell") constructed in accordance with the present invention.

Referring firstly to FIG. 1, which represents the general arrangement of a load sensor constructed in accordance with the present invention: it consists of an elastic member 2, which typically is made from hardened and tempered steel, whose properties are such that it will sustain a high stress without exceeding the limit of virtually perfect elasticity. The elastic member 2 has at its lower end a cylindrical portion 4 with a lower surface 6 having a spherical surface of radius typically twice the height of the elastic member. The upper end of the elastic member 2 has a similar cylindrical portion 8 with an upper surface 10 having a spherical radius of curvature typically about equal to the height of the elastic member. The elastic member 2 operates between two hardened steel bearing surfaces (shown as 56 and 60 in FIG. 3), and the combination of the spherical surfaces 6 and 10 with the said bearing surfaces 56 and 60 is intended to ensure that the elastic member remains mechanically stable when force is applied through the upper bearing surface in the direction of the arrow F. The cylindrical portions 4 and 8, and the spherical surfaces 6 and 10 are normal features of conventional load cells.

Figure 2:
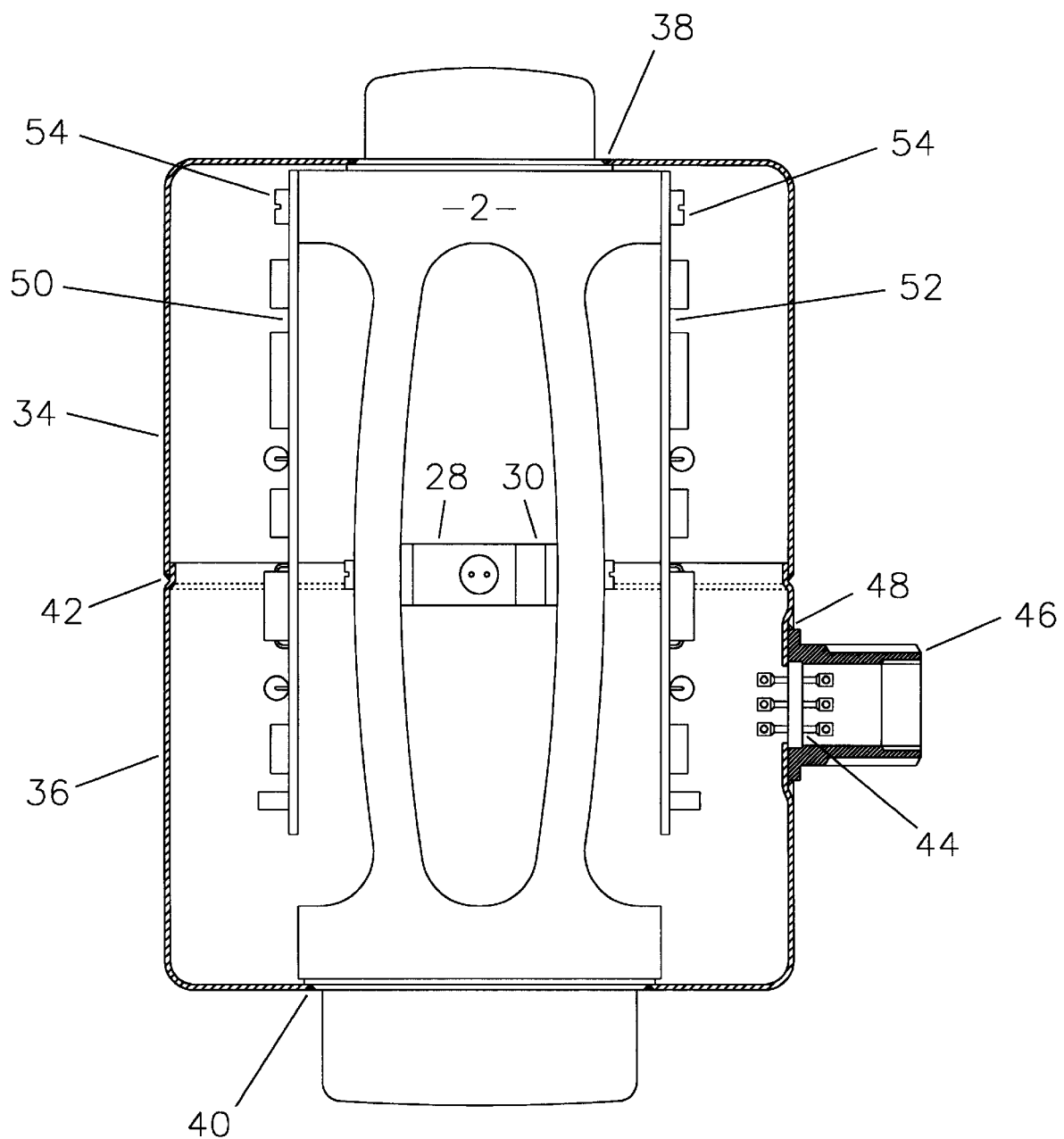
FIG. 2 illustrates the load sensing device of FIG. 1 enclosed, with its electronics, in a protective housing.

The cylindrical portions 4 and 8 are extensions of square or rectangular intermediate portions 14 and 16 which provide end fixity for two curved compression members 18 and 20 of rectangular cross section. Cylindrical radii, of which 22 is typical, at both ends of each of the compression members 18 and 20 minimize the stress concentrations where they meet the intermediate portions 14 and 16. Where the cylindrical portions 4 and 8 meet the intermediate portions 14 and 16 there are formed rebated upstands 24 and 26 where a protective housing can be attached, as shown in FIG. 2. At the center of each of the compression members 18 and 20, on the surfaces facing each other, are attached respectively a sensor carrier 28 and a scale carrier 30 (largely shown dotted), forming the measuring system which is used to determine the displacements away from each other of the compression members 18 and 20 under a load applied at F. Screws 32 secure the sensor carrier 28 to the compression member 18 and the scale carrier 30 to the compression member 20. Other means of attachment are possible, for example adhesives or mechanical clamping, if it is considered necessary to avoid generating stress concentrations due to holes in compression members 18 and 20, but this is not necessarily critical.

To minimize problems arising from temperature variations, and particularly those arising from adiabatic loading, it is desirable for the sensor carrier 28 and the scale carrier 30 to be made of a material having the same coefficient of thermal expansion as that of the elastic member 2, and for them to be in good thermal contact with the said elastic member 2. In this way, when the temperature of the elastic member 2 changes, either due to environmental changes or due to changing loads, the temperature of both the sensor carrier 28 and the scale carrier 30 follow it accurately, and their thermal expansion compensates for the thermal expansion of the elastic member 2. In this way the only significant thermal effect is the variation of the Young's Modulus of the elastic member 2 with temperature; for many purposes this can be ignored, but when greater accuracy is required the temperature can be measured and a correction applied.

FIG. 2 illustrates the way in which the critical parts of the elastic member 2 and the measuring system components 28 and 30 are protected in operation by a housing consisting of upper and lower cylindrical cups 34 and 36, welded to the elastic member 2 at 38 and 40 respectively, and to each other at 42. Electrical connections are taken to the interior of the housing so formed through metal-to-glass seals 44 in an outlet spigot 46 which is welded to the lower cup 36 at a joint 48. Electrical circuit boards 50 and 52 (shown diagrammatically, and not as a realistic drawing) can if required be secured to the upper part of the elastic member 2 by means of screws 54, although alternative mounting means within the housing are possible. Electrical connections will be required between the displacement measuring means 28 and 30, the circuit boards 50 and 52, and the metal-to-glass seals 44, but these are conventional, and to avoid confusion are not shown in the drawing.

Figure 3:
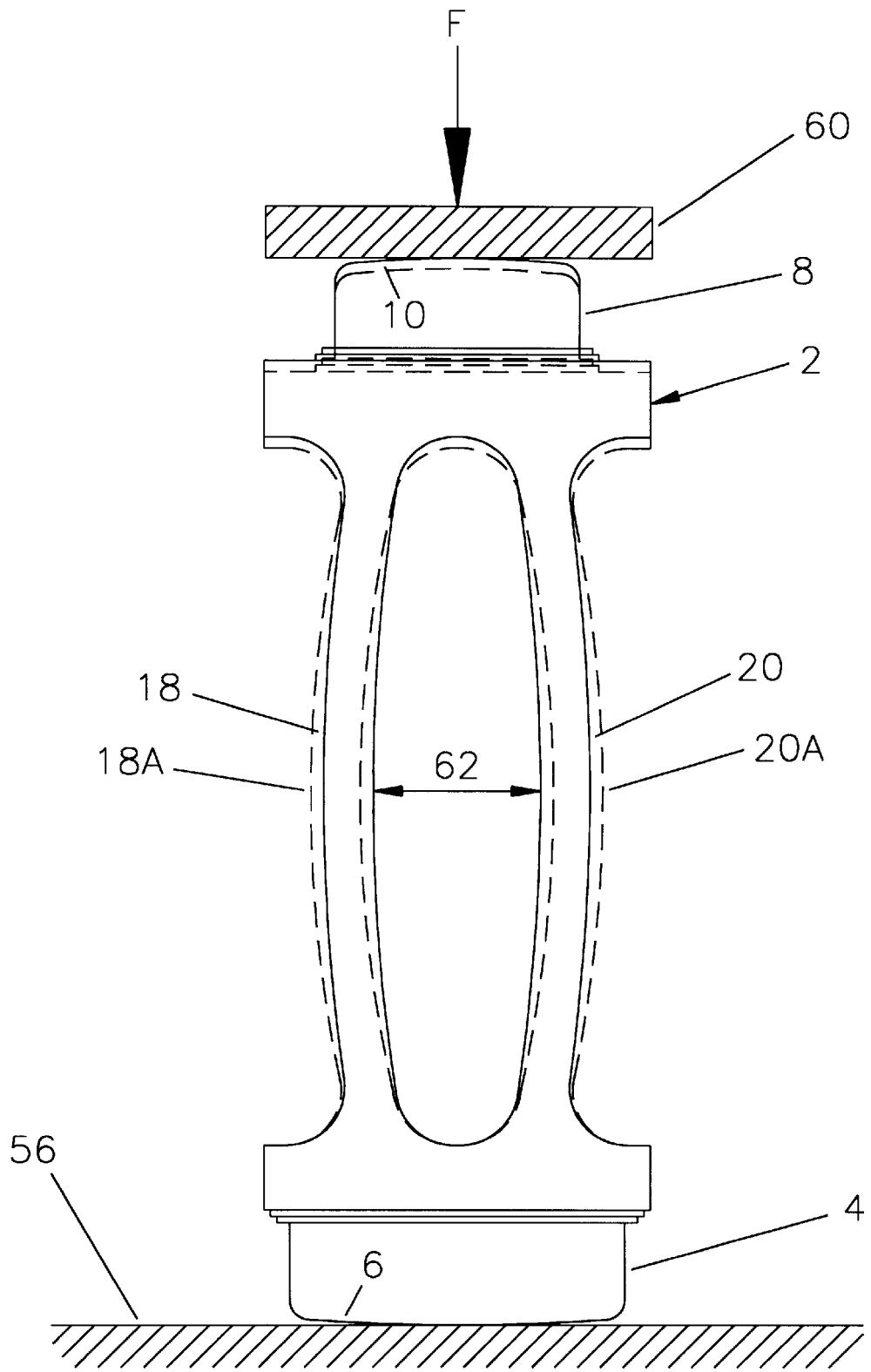
FIG. 3 shows the mode of deflection of the elastic member of FIG. 1 under load.

FIG. 3 shows how in operation the elastic member 2 of the load cell is typically supported with the spherical surface 6 on a hardened flat surface 56, and a compressive force F is applied to the spherical surface 10 through a hardened pad 60. One or both of the cylindrical portions 4 and 8 may be constrained in position by circular bushes, but these are not shown in the drawing. The spherical surfaces 6 and 10 ensure that the points of application of force remain close to the center line of the device, provided that the flat bearing surfaces with which they are in contact remain approximately parallel. As a consequence of their curved shape, and under the influence of the force F, a bending moment is developed in the compression members 18 and 20, which deflect to the positions shown dotted as 18A and 20A. The increase in the separation 62 between their mid points is measured by the linear displacement measuring means consisting of the sensor carrier 28 and the scale carrier 30 shown in FIG. 1, but omitted from FIG. 3 in the interest of clarity. Because the increment of deflection for a given increment of force is dependent on the curvature, the relationship between force and deflection will be non-linear. An approximate value of the force can be obtained by a simple constant of proportionality, and the accurate value found from a lookup table. Alternatively, a more complex polynomial in the form of a power series can be used in the signal processing operation, to yield directly an accurate value of the applied force.

Figure 4:
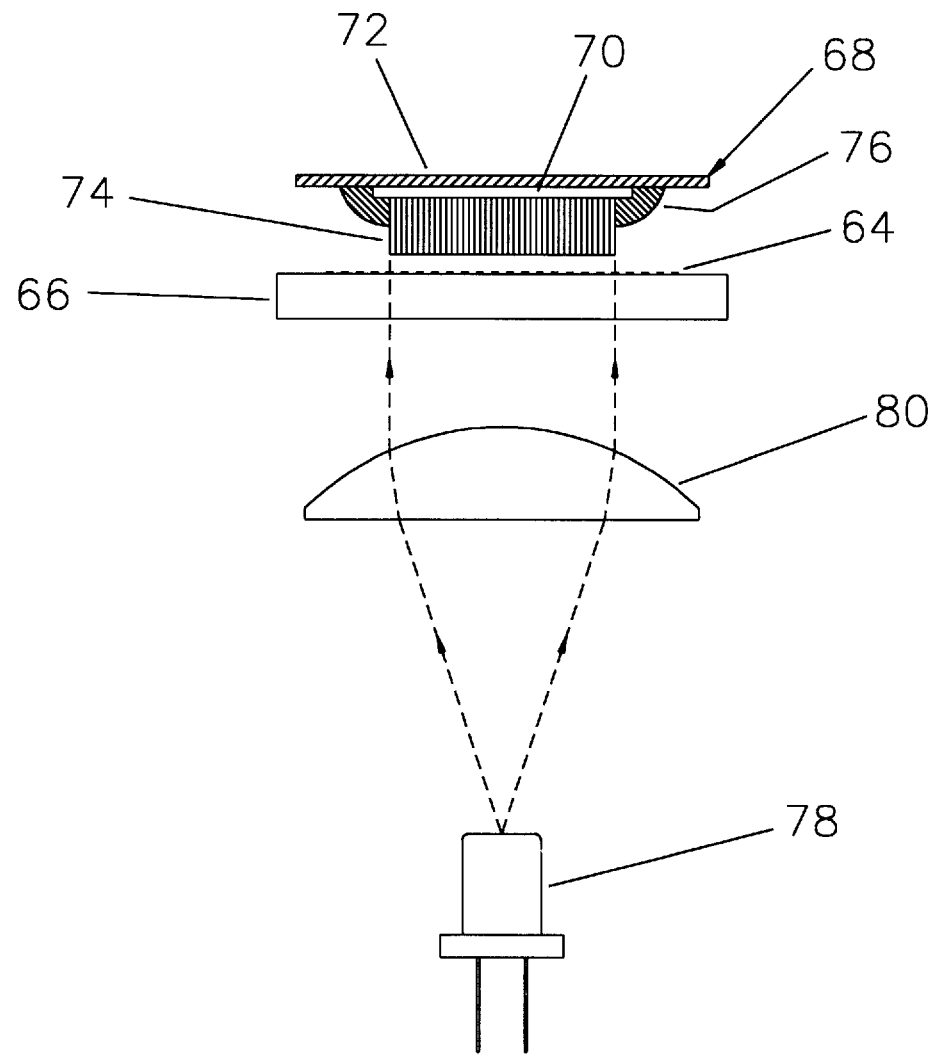
FIG. 4 depicts the basic optical arrangement of the linear displacement measuring means used in FIG. 1.

The essential components of a displacement measuring system applying the principles of European Patents 0100243 and 0184286 are illustrated in FIG. 4. A scale 64, which may be etched from evaporated chromium, is formed on the surface of the glass or quartz substrate 66, which is in turn carried on the scale carrier 30 of FIG. 1 (not shown in FIG. 4). The movement of the scale is determined relative to the sensor assembly 68, consisting of a linear array of photo elements on a silicon die (colloquially, a "chip") 70, mounted on an alumina plate 72 which carries the electrical connections (not shown) to the die. A short stub of fused optical fibers 74 is attached to the surface of the silicon die 70, and the bond wires (not shown) connecting the die to the tracks on the alumina plate 72 are covered by a sealing compound 76. The sealing compound 76 is desirably opaque black, to prevent stray light reaching the die 70 from causing adverse photoelectric effects. The scale 64 is typically 50 μm from the face of the fibre optic 74, and is "shadowed" on to it by light from the light emitting diode 78, collimated into a parallel beam by the lens 80. The fused fibre optic 74 conducts the light forming the shadowed image of the scale 64 to the photo elements on the surface of the silicon die 70; this is necessary because the bond wires (not shown) project from the surface of the die 70, and thereby prevent a sufficiently close direct approach to it of the scale 64.

Figure 5:
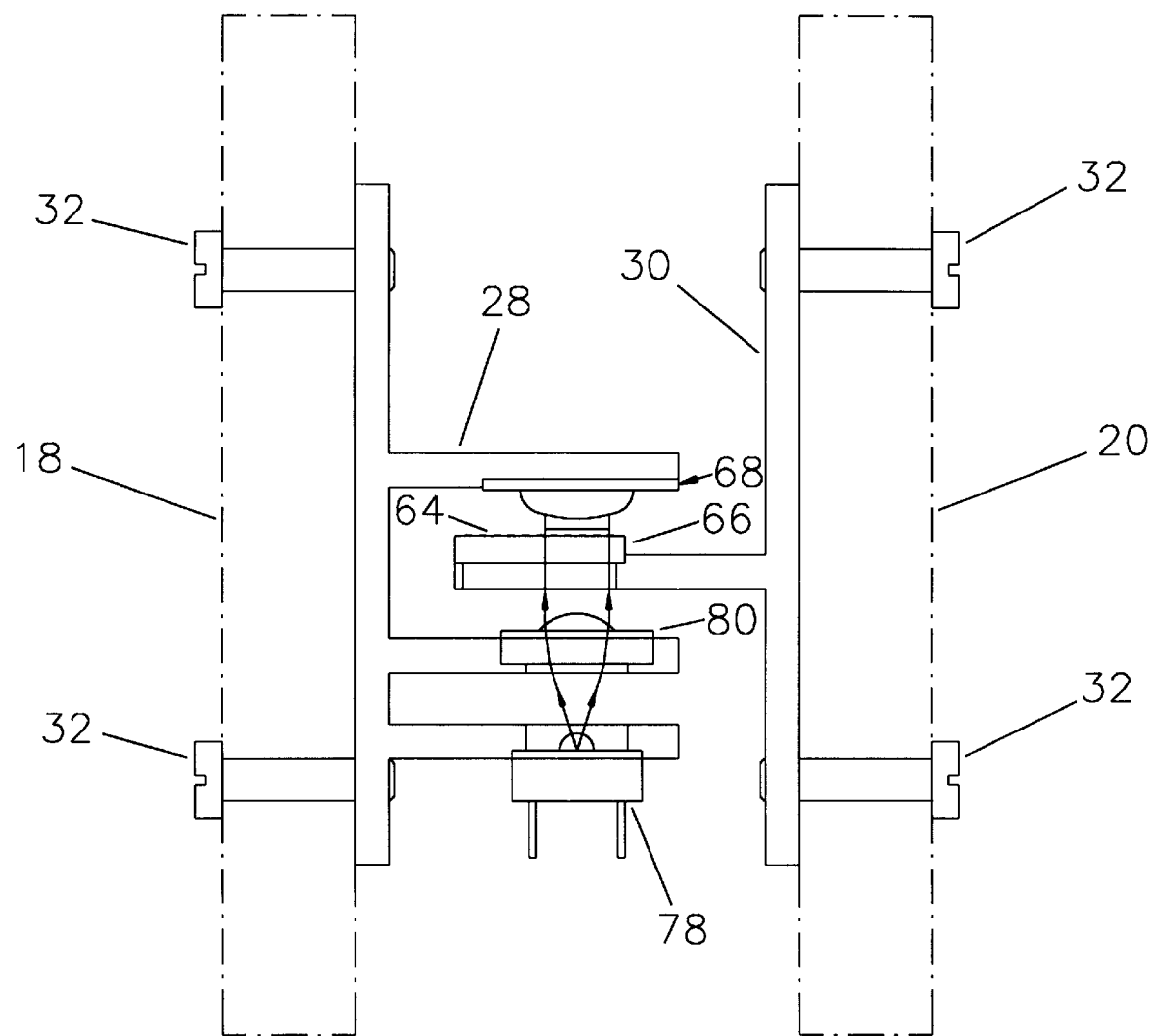
FIG. 5 is a view from the direction "X" in FIG. 1 of the linear displacement measuring means of the loadcell.

A practical embodiment of the components illustrated in FIG. 4 is shown in FIG. 5, in which the sensor 68, the lens 80, and the light emitting diode 78 are supported by the sensor carrier 28, attached to the compression member 18 as shown in FIG. 1. The scale 64, on the transparent substrate 66, is supported by the scale carrier 30, attached to the compression member 20. The light emitting diode 78 is of a type which emits light uniformly in all directions within an appropriate solid angle, so that after collimation by the lens 80 an approximately parallel beam is formed of uniform intensity. It will be seen that in the position shown the sensor 68 is at one end of the scale 64, so that it traverses the length of the scale 64 as the compression members 18 and 20 separate under load.

Figure 6:
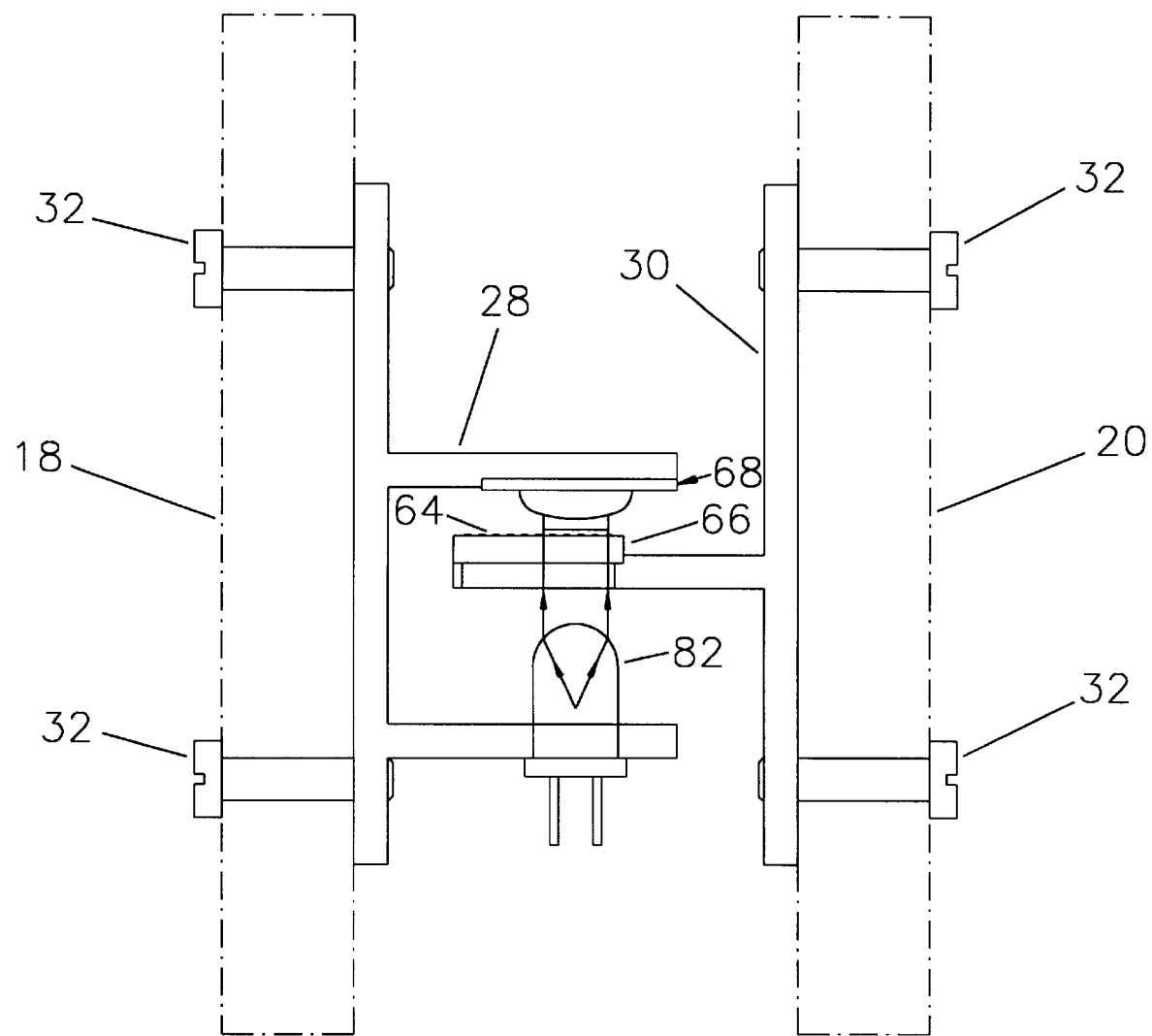
FIG. 6 represents an alternative optical arrangement for the linear displacement measuring means of FIG. 4.

An alternative and slightly simpler optical arrangement is depicted in FIG. 6, in which the separate light emitting diode 78 and lens 80 are replaced by a light emitting diode 82 having a hemispherical end. The sensor carrier 28 is modified because there is one less component to support, but all other items remain the same as in FIG. 5. The light emitting diode 82 would be unlikely to provide a beam as uniform or as parallel as the combination of diode 78 and lens 80 in FIG. 5, but for many purposes, where the highest accuracy is not required, it will be found adequate.

Figure 7:
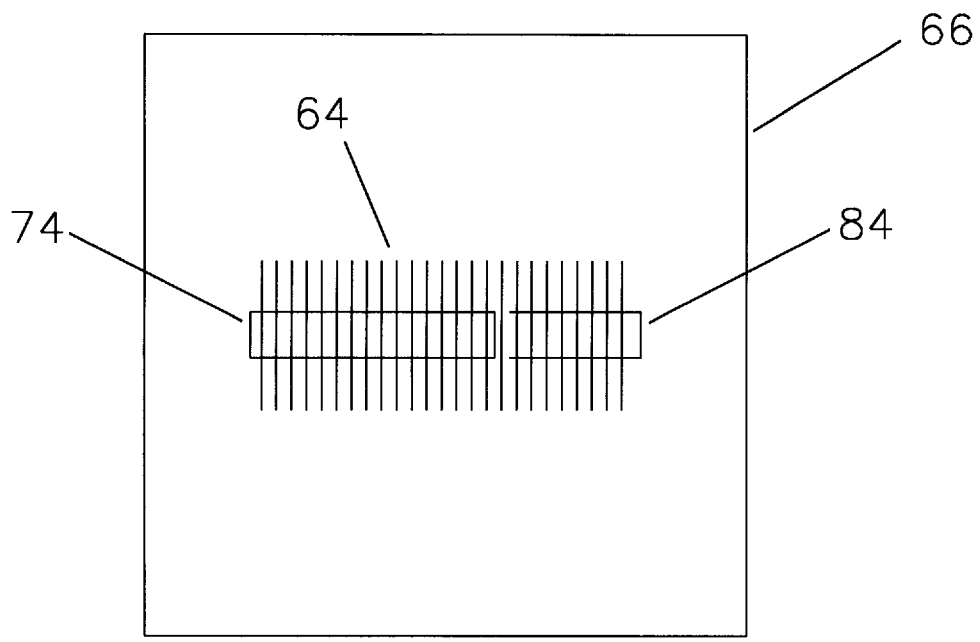
FIG. 7 illustrates the relationship of the optical scale to the sensing device used in the measuring means of FIGS. 5 and 6.

FIG. 7 shows the general arrangement of the scale 64 (drawn diagrammatically) on the substrate 66, and the path 84 of the fused fibre optic 74 (seen in FIG. 4) relative to it. The scale 64 is made considerably wider than the fibre optic 74, so that its precise relationship in a direction perpendicular to the direction of movement is unimportant. To minimize the amount of stray light reaching the sensor (68 in FIGS. 4, 5, and 6), the scale 64 is formed as clear portions in an otherwise opaque coating on the surface of the substrate 66.

Figure 8:
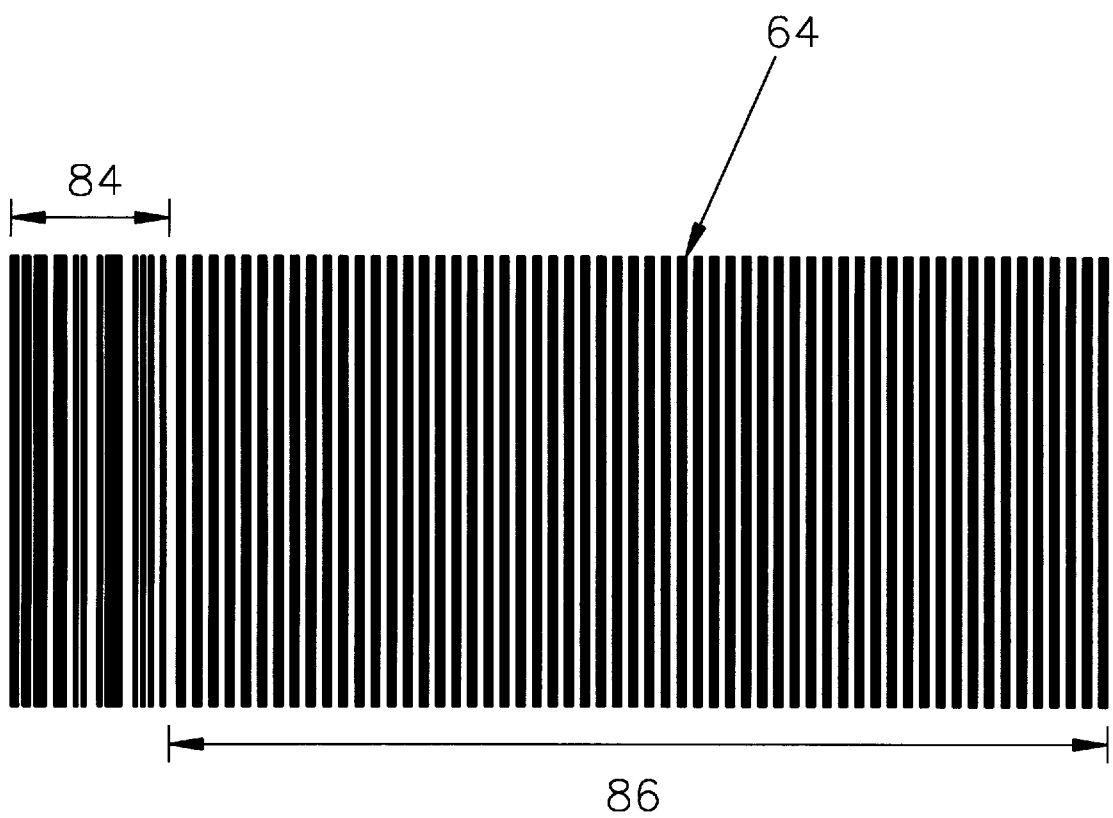
FIG. 8 is an enlarged view of the optical scale shown in FIG. 7.

A representative pattern suitable for the scale 64 is illustrated in FIG. 8. In this example, for convenience of drawing, the scale is shown as a negative, in which the black lines represent clear portions and the remainder is opaque. The part of the scale denoted by 84 is a pseudo-random binary pattern, which as explained in European Patents 0100243 and 0184286 is used in a correlation process to determine the coarse position of the scale 64 relative to the sensor 68, while the remaining part of the scale denoted by 86 is a uniform bar pattern which interacts with the photosensitive elements on the sensor 68 to generate a form of moire fringe, whose phase is used to establish the fine position.

Figure 9:
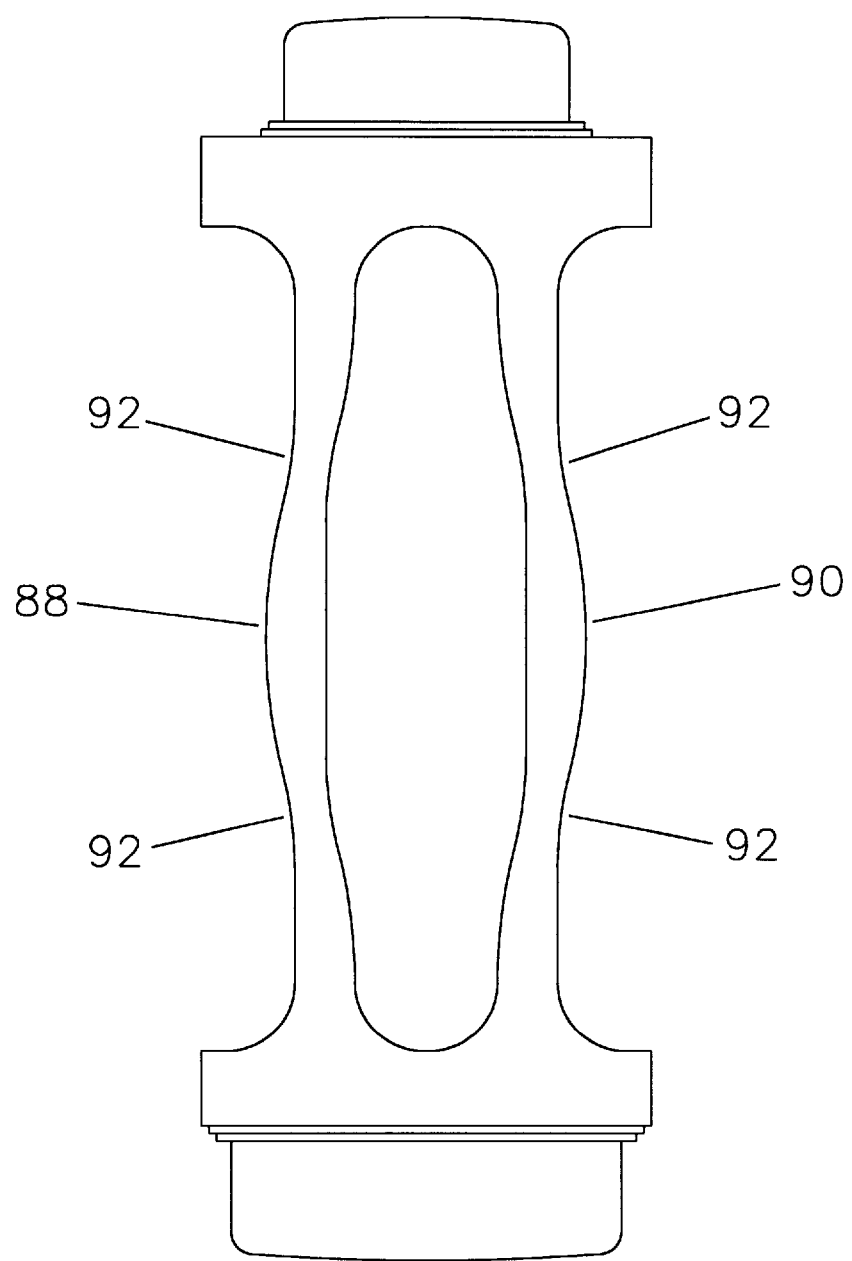
FIG. 9 represents an alternative form of elastic member according to the present invention.

There is no reason why the compression members 18 and 20 of FIG. 1 should take the form of bars of rectangular cross-section and uniform curvature, although this is a simple form to design and manufacture. In practice, the simple shape shown in FIGS. 1 to 3 tends to have stress concentrations both at the ends and at the centre of each member, and improved performance can be obtained by shaping the compression members as shown at 88 and 90 of FIG. 9, where they are reduced in thickness at the positions of minimum bending moment 92, so that the stress distribution is as uniform as possible at maximum load. In this way maximum deflection, and hence maximum sensitivity, are obtained for a given peak load and maximum stress.

Figure 10:
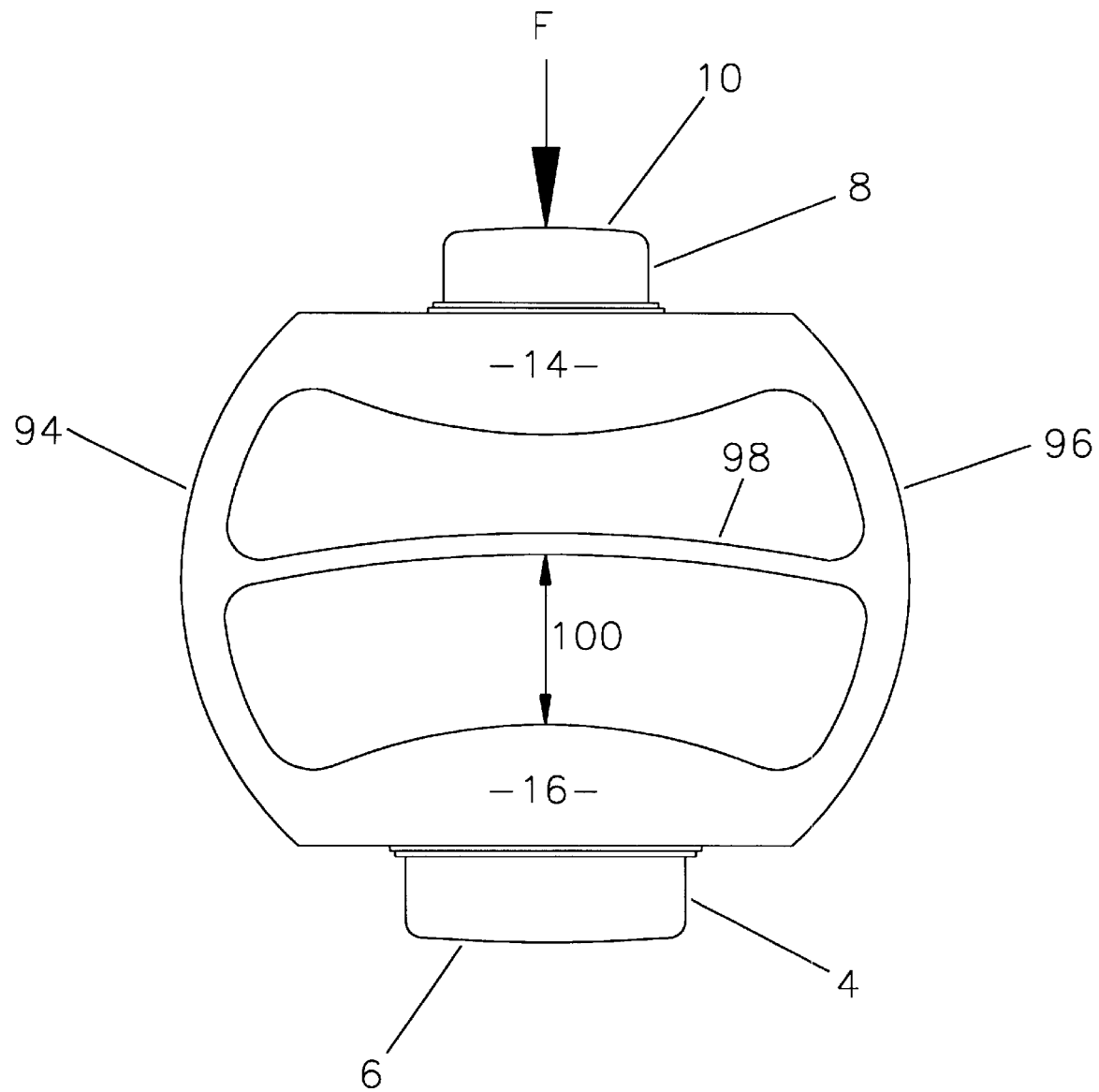
FIG. 10 illustrates a further alternative form of elastic member according to the present invention.

It is not essential for the member or members whose lateral deflection is used to sense the applied force, as in 18 and 20 of FIG. 1, to be used directly to resist that force, and FIG. 10 illustrates in side elevation an alternative arrangement embodying two compression members and a separate sensing member. Retaining, as far as possible, the same numbering as FIG. 1, the top and bottom intermediate portions 14 and 16 are elongated laterally, and transmit the force applied at F (and resisted by the surface 6 resting on a hard pad, not shown) to compression members 94 and 96, between which is a curved sensing member 98. The effect of the force F is to cause the compression members 94 and 96 to deflect away from each other, thereby applying an end load to the sensing member 98. Under such end load the sensing member 98 deflects downwards towards the intermediate portion 16, and from a measurement of the change in the distance 100 between them, the magnitude of the force applied at F can be determined. It will be evident that considerable freedom exists to control the sensitivity of the system by varying the curvature and thickness of the sensing member 98, since it is not required to support the applied load. Additionally, it is possible at least in part to offset the non-linear response of the compression members 94 and 96 to the applied load, by the inverse non-linear response of the sensing member 98. It will be evident that considerable freedom exists in the design of elastic members for sensing force in accordance with the present invention, and the figures shown are to be regarded only as representing possible configurations. The sensing member or members may support the load, as in FIG. 1, or may be independent of it, as in FIG. 10. An arrangement of the type shown in FIG. 10 may well be particularly useful where it is desired to keep the overall height of the elastic member, between the surfaces 6 and 10, to a minimum. Likewise, it is perfectly practicable, for some applications, to make the elastic member from other materials, for example reinforced plastics, instead of from hardened steel. The precise design should be within the capabilities of any person skilled in the art, and advantageously having appropriate facilities for mathematical stress analysis.

I claim:
1. A force sensing device comprising:
   an elastic member composed at least partially of elastically deformable material, said elastic member receiving a force along a longitudinal axis and including
   two respective transversely extending intermediate end portions at respective longitudinal ends of said elastic member, said intermediate end portions extending at least transversely as defined by a transverse plane perpendicular to the longitudinal axis,
   opposed generally concave leg members extending between said two intermediate end portions and spaced on respective lateral sides of a central plane including the longitudinal axis, said leg members defining an open area therebetween in a face plane perpendicular to the central plane and the transverse plane, and each said leg member having a flared end portion integral with an associated said intermediate end portion at an intersection with the associated said intermediate end, said flared end portions minimizing stress concentrations at the intersections;

two respective connection portions attached longitudinally outward from respective said intermediate end portions of said elongate member to which a force to be measured is applied; and a measurement means for measuring a distortion of said leg members when a force is applied between said connection portions.

2. A force sensing device according to claim 1 in which said measurement means are arranged to measure variation in a separation distance of said opposed leg members.

3. A force sensing device according to claim 2 in which said measurement means includes first and second elements secured to said opposing leg members parallel to the transverse plane, and further including relational means for measuring relative displacement of said first and second elements.

4. A force sensing device according to claim 3 in which said relational means comprise a sensor on said first element for making optical measurements of the relative displacement of said second element.

5. A force sensing device according to claim 1 further comprising means for determining the force applied between said connection portions using said measured distortion.

6. A force sensing device according to claim 1 in which each said leg member is of non-uniform thickness in between associated said flared ends such that the thickness is least at respective positions on opposite sides of a middle portion of each said leg member.

7. A force sensing device according to claim 6 in which each said leg member in between associated said flared ends is of greatest thickness at the middle portion.

8. A force sensing device according to claim 1 in which each said leg member is arcuate.

9. A force sensing device according to claim 1 in which each said leg member is enclosed in a container, from which respective parts of connection portions attached to said measurement means protrude.

10. A force sensing device as claimed in claim 1:

wherein said end portions extend laterally on each lateral side of the central plane further than respective said leg members extend laterally on each respective lateral side of the central plane.

11. A force sensing device comprising:

an elastic member composed at least partially of elastically deformable material, said elastic member receiving a force along a longitudinal axis and including two respective transversely extending intermediate end portions at respective longitudinal ends of said elastic member, said intermediate end portions extending at least transversely as defined by a transverse plane perpendicular to the longitudinal axis, opposed generally concave leg members extending between said two intermediate end portions and spaced on respective lateral sides of a central plane including the longitudinal axis, said leg members defining an open area therebetween in a face plane perpendicular to the central plane and the transverse plane, an elastically deformable intermediate member in said open area which connects said opposed leg members, and each said leg member having a widened end portion integral with an associated said intermediate end portion at an intersection with the associated said intermediate end, said widened end portions minimizing stress concentrations at the intersections;

two respective connection portions attached longitudinally outward from respective said intermediate end portions of said elongate member to which a force to be measured is applied; and a measurement means for measuring a distortion of said intermediate member when a force is applied between said connection portions.

12. A force sensing device as claimed in claim 11:

wherein said intermediate member is arcuate.

* * * * *